United States Patent
Novo Diaz et al.

(10) Patent No.: US 10,979,865 B2
(45) Date of Patent: Apr. 13, 2021

(54) HANDLING OF DEVICES BASED ON GROUP MEMBERSHIP

(71) Applicant: Telefonaktiebolaget LM Ericsson (publ), Stockholm (SE)

(72) Inventors: Oscar Novo Diaz, Helsinki (FI); Parth Amin, St Albans (GB); Nicklas Beijar, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/775,860

(22) PCT Filed: Dec. 3, 2015

(86) PCT No.: PCT/SE2015/051307
§ 371 (c)(1),
(2) Date: May 14, 2018

(87) PCT Pub. No.: WO2017/095284
PCT Pub. Date: Jun. 8, 2017

(65) Prior Publication Data
US 2018/0332443 A1 Nov. 15, 2018

(51) Int. Cl.
*H04W 4/08* (2009.01)
*H04W 88/16* (2009.01)
(Continued)

(52) U.S. Cl.
CPC ........... *H04W 4/08* (2013.01); *H04W 4/60* (2018.02); *H04W 4/70* (2018.02); *H04W 84/18* (2013.01)

(58) Field of Classification Search
CPC ........... H04W 4/08; H04W 4/60; H04W 4/70; H04W 84/18; H04W 88/16
(Continued)

(56) References Cited

U.S. PATENT DOCUMENTS

| 2011/0238822 A1* | 9/2011 | Weniger .............. H04W 80/045 709/224 |
| 2013/0034031 A1* | 2/2013 | Sherman .............. H04W 40/26 370/310 |

(Continued)

FOREIGN PATENT DOCUMENTS

| EP | 2536183 A1 | 12/2012 |
| EP | 2547040 A1 | 1/2013 |

(Continued)

OTHER PUBLICATIONS

Beijar, Nicklas, et al., "Gateway Selection in Capillary Networks", 5th International Conference on the Internet of Things (IoT), Ericsson Research, Jorvas, Finland, 2015, 8 pages.
(Continued)

*Primary Examiner* — Paul H Masur
*Assistant Examiner* — Ellen A Kirillova
(74) *Attorney, Agent, or Firm* — Sage Patent Group

(57) ABSTRACT

A network node, a device and methods therein are provided for handling of devices based on group membership. The method performed by the network node comprises obtaining of information indicating a group membership and further indicating reachable gateways of a set of devices. The method further comprises initiating a command to a number of devices out of the set of devices belonging to the same group, G1, to connect to one of the indicated gateways, gateway W, selected for the number of devices based on group membership.

4 Claims, 5 Drawing Sheets

(51) Int. Cl.
  *H04W 4/60* (2018.01)
  *H04W 84/18* (2009.01)
  *H04W 4/70* (2018.01)

(58) Field of Classification Search
  USPC .......................................................... 370/329
  See application file for complete search history.

(56) References Cited

U.S. PATENT DOCUMENTS

| | | | |
|---|---|---|---|
| 2014/0241354 A1 | 8/2014 | Shuman et al. | |
| 2015/0373481 A1* | 12/2015 | Eom | H04W 48/18 |
| | | | 370/329 |
| 2016/0081133 A1* | 3/2016 | Kim | H04L 63/0876 |
| | | | 370/329 |
| 2017/0126577 A1* | 5/2017 | Sender | H04W 8/18 |
| 2018/0332443 A1* | 11/2018 | Novo Diaz | H04W 4/70 |

FOREIGN PATENT DOCUMENTS

| | | |
|---|---|---|
| EP | 2552168 A1 | 1/2013 |
| EP | 2768260 A1 | 8/2014 |
| WO | 2012106619 A1 | 8/2012 |
| WO | 2014077580 A1 | 5/2014 |

OTHER PUBLICATIONS

Sachs, Joachim, et al., "Capillary Networks—a Smart Way to Get Things Connected", Ericsson Review, Sep. 9, 2014, 8 pages.

\* cited by examiner

US 10,979,865 B2

HANDLING OF DEVICES BASED ON GROUP MEMBERSHIP

TECHNICAL FIELD

The invention relates to the concept of Internet of Things (IoT), and in particular to handling of devices belonging to a group.

BACKGROUND

The so-called "Internet of Things" (IoT) concept aims at scenarios with massive numbers of small wireless devices. Experts estimate that the IoT will consist of almost 50 billion objects by 2020. These small wireless devices are envisioned to only be equipped with short-range radios, operable according to protocols for short-range communication, such as Bluetooth, ZigBee, and Wi-Fi. In order to obtain long-range connectivity, e.g. to transfer data to a cloud storage or receiving commands from a management system, such devices need to connect to a gateway that provides long-range connectivity. A gateway has both one or more short-range interfaces and one or more long-range (e.g. 3G or 4G cellular) interfaces, and transfers data between those.

A particular type of IoT Networks is multi-hop networks. In these networks, all devices do not have direct radio connectivity to a gateway. A device outside the range of a gateway connects to another device, which is inside the range of the gateway. This device relays the traffic between the other device and the gateway. Several such relaying devices may exist on the path between a device and the gateway.

Because of the high number of devices in an IoT scenario, it is more efficient to manage these devices on a group basis, rather than on a device by device basis. A group is typically defined as devices with similar properties. For example, all devices of a certain type can form one group, e.g. streetlights, pollution detectors, electric meters etc. A device may belong to multiple groups. For example, a group may additionally be defined as the devices at a certain location, e.g. streetlights on Abbey Road. By using groups, it is possible to address a message to a set of devices, for example in order to switch on all streetlights in a certain region.

Multicasting is a well-known technique for distributing a message to a group of devices. Many Local Area Networks (LANs), as well as short-range wireless networks support local multicasting. Thus, on the link layer, a single multicast message may be sent, that is received by a group of devices. This technique is used in a high number of protocols operating within a single LAN. On the other hand, in Wide Area Networks (WANs), multicasting is typically not supported, since it requires lots of management, configuration and support from all devices, e.g. in the form of a multicast routing protocol.

The market for connected devices is growing tremendously. Even though there are industry standards available that cater for the connectivity requirements of the devices in Internet, it would be beneficial to improve the handling of groups of devices, e.g. such that groups of devices could be managed and addressed efficiently.

SUMMARY

In embodiments herein, the group membership of devices is considered in connecting the devices to gateways or to other devices. The objective is to connect all members of a group to a single gateway or to a low number of gateways. Advantages of the embodiments are e.g. reduced cost, reduced bandwidth and latency as will elaborated below.

Embodiments of the invention may reside in the so-called cloud or a gateway, and uses group membership information of the devices to determine which device that should be connected to which gateway. Thereby, it is possible to control that devices belonging to the same group are either connected to the same gateway, or, at least to as few gateways as possible. Devices belonging to the same group may be connected to a gateway directly or through other devices.

The applying of embodiments of the invention reduces the number of messages needed to be sent to the gateways and also from gateways to the connected devices. Reduction of the number of messages from an application server to the gateways reduces the cost of cellular communication.

For example, if all streetlights on the same street are assigned to the same group and connected to the same gateway, a single command can be sent to the gateway in order to switch on all lights. Similarly, a group can be defined of lights in a particular room or corridor, and these devices can be controlled efficiently. Soil quality sensors in a particular field can be read with a single measurement command.

Further, the latency of the devices may be reduced, as only one or at least a minimum number of gateways are involved in the sending messages within a group. Also, latency across devices within a group will be similar, as they are managed by the same gateway. For e.g. in the home lighting use case, all the light actuators within the chandelier are needed to be switched on within 100 milliseconds delay, as more time than that is detected by the human eye.

Moreover, devices may have a need to communicate directly with other devices in the same group. If all devices are under the same gateway, they can communicate within the short-range network. No costly WAN communication across gateways is needed and the latency is lower. If devices are under several gateways, the communication needs to traverse the gateways. In that case, the embodiments described herein reduce the number of gateways to which WAN communication is sent.

For example, a movement detector in one streetlight may send a message to all other streetlights (e.g. those along the same street) to switch on as traffic on that street has been detected.

An automatic system to assign the gateways and to interconnect devices has the advantage over static configuration that it can react automatically to changing conditions. If there is a fault in a gateway, in the gateway's uplink, or in some relaying node, new connections will be automatically generated without the cost and delay caused by manual reconfiguration. This is enabled by embodiments described herein.

According to a first aspect, a method is provided for handling groups of devices. The method is to be performed by a network node or network arrangement operable in a communication network. The method comprises obtaining information indicating a group membership and indicating reachable gateways of a set of devices. The method further comprises initiating a command to a number of devices out of the set of devices belonging to the same group, G1, to connect to one of the indicated gateways, gateway W, selected for the number of devices based on group membership.

According to a second aspect, a method is provided, which is to be performed by a device with short-range radio communication capabilities operable in a communication network. The method comprises providing information indicating a device group membership of the device, and gateways reachable to the device, to a network node and/or neighboring devices.

According to a third aspect, a network node or network arrangement is provided which is operable in a communication network. The network node/network arrangement is configured to obtain information indicating a group membership and further indicating reachable gateways of a set of devices. The network node/network arrangement is further configured to initiate a command to a number of devices, out of the set of devices belonging to the same group, G1, to connect to one of the indicated gateways, gateway W, selected for the number of devices based on group membership.

According to a fourth aspect, a device with short range radio communication capabilities is provided. The device is configured to provide information indicating a device group membership of the device, and gateways reachable to the device, to a network node and/or neighboring devices.

According to a fifth aspect, a computer program is provided, comprising instructions which, when executed on at least one processor, cause the at least one processor to carry out the method according to any of claims 1-20.

According to a sixth aspect, a carrier is provided, containing the computer program of the preceding claim, wherein the carrier is one of an electronic signal, optical signal, radio signal, or computer readable storage medium.

BRIEF DESCRIPTION OF DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

The established standards for connectivity requirements of IoT devices in Internet are not taking organized group management into account. The inventors have observed that IoT devices select the gateways to which they connect either randomly or based on signal strength or properties of the gateways. According to some solutions, network nodes select gateways for the IoT devices in order to balance the load between gateways. There are no current methods that consider group membership.

Herein, the terms "device" or "IoT device" are used interchangeably in the meaning of a "thing" embedded with electronics, software and possibly sensors, which is operable for network connectivity, which enables the thing/object to collect data from and exchange data with other entities. The network connectivity is typically of short-range type, e.g. to keep energy consumption at a low level. "Things," in the IoT sense, can refer to a wide variety of devices. Examples of devices, or "things", are street lights, as used herein, but also e.g. heart monitoring implants, biochip transponders on farm animals, electric clams in coastal waters, automobiles with built-in sensors, or field operation devices that assist firefighters in search and rescue operations. Some devices collect useful data with the help of various existing technologies and then autonomously flow the data to or between other devices. Devices may be organized in groups, e.g. to facilitate management of and communication with a set or category of devices.

Figure 1:
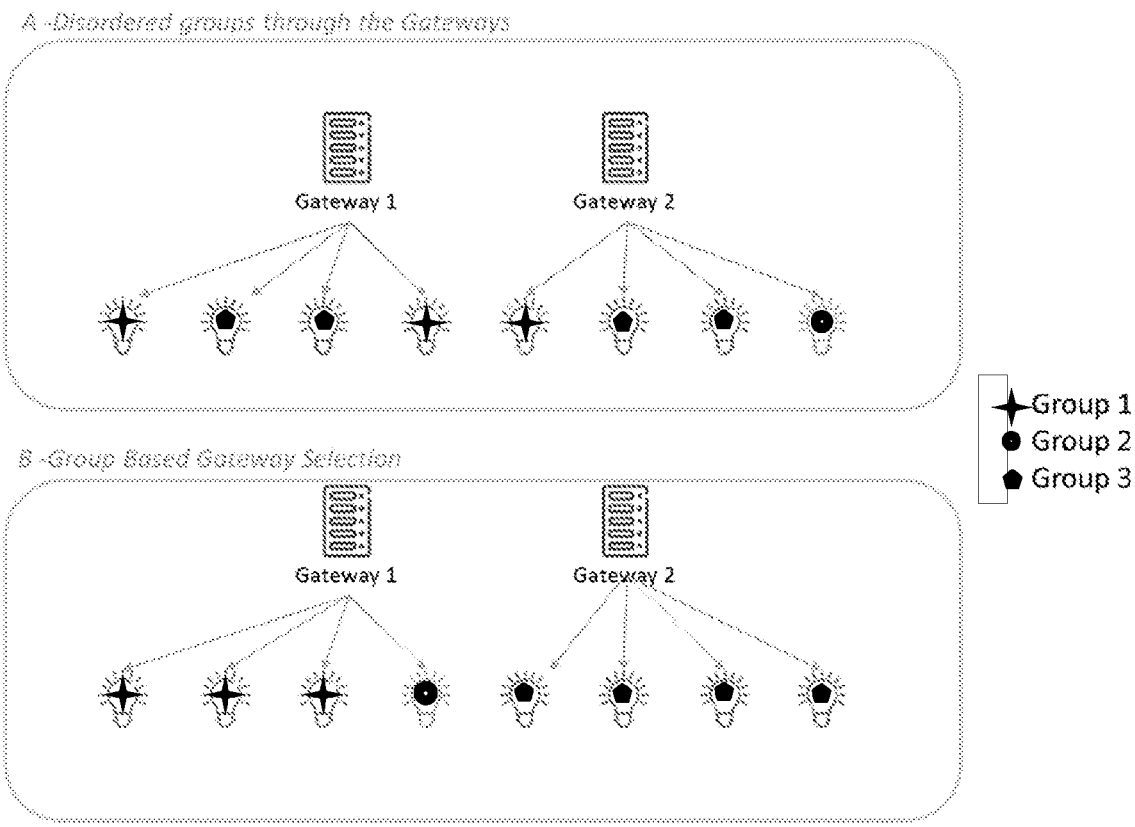
FIG. 1 illustrates A): a gateway selection for IoT devices according to the prior art, and B): group based gateway selection for IoT devices according to an exemplifying embodiment

With the existing methods, nodes belonging to the same group may select different gateways for long-range connectivity. FIG. 1A illustrates a scenario where devices belonging to different groups are randomly connected to different gateways. The members of a group are then spread out between numerous gateways. In order to broadcast a message to group members in such a scenario, the message needs to be sent out separately to each gateway to which members of the group are connected. After that, gateways can use local multicasting in the capillary network to distribute the message to the members of the group that are under this gateway. A scenario as the one depicted in FIG. 1A results in at least three types of problems: i) inefficient use of radio resources due to multicast messages sent by multiple gateways; ii) differences in the delay of the transmissions and thus e.g. in the execution of a command sent to the devices; and iii) the cost of using the cellular link connecting the cloud application to a plurality of gateways.

Given that broadcast or multicast should be used by gateways for communicating with IoT devices, it would be beneficial to have as many group members as possible under a gateway and as few gateways as possible with members. In other words, it would be beneficial if all members of a group of IoT devices were connected to the same gateway, and when that is not possible, it would be beneficial if the members of a group of IoT devices were connected to as few gateways as possible.

Further, if the devices belonging to the same group are spread over, i.e. connected to, a plurality of different gateways, the delay in the transmissions across gateways gets difficult to control. For example, in a home lighting use case, all the light actuators within a chandelier are required to be switched on within 100 milliseconds delay, if the difference in timing should not be detectable by the human eye. This cannot be guaranteed for devices being connected to different gateways.

The embodiments described herein assume a set of prerequisites. For example, it is assumed that the information about to which groups a device belongs to is available in the gateway or can be obtained at the gateway either from the cloud or from the connected devices. The group membership can be based on properties of the device, e.g. the device type and manufacturer, stored as management objects (e.g. IPSO) in the device. However, the gateways or a central node may keep the rules of which properties are mapped to which group. Thus, once a device connects e.g. to a gateway, the gateway can determine, e.g. by querying properties from the device, the groups in which the device is a member. The gateway can also query a device about which other gateways it can reach. An indication of a group identity provided by a device to a gateway may thus be e.g. provided information about device type and/or manufacturer, which are matched to a list of group identities connected to device types and/or manufacturers Below, different embodiments of a solution will be described. Devices may be connected to a gateway directly, i.e. via a single hop between gateway and device. Alternatively, devices may be connected to a gateway in a multi-hop manner, i.e. having a plurality of hops between the devices and gateways via supporting relay devices. The decision of to which gateway a device should connect may be taken in different entities depending on implementation. For example, the decision can be taken by a central network node, e.g. in a cloud; or be taken by a gateway, or be taken by the devices.

Figure 3:
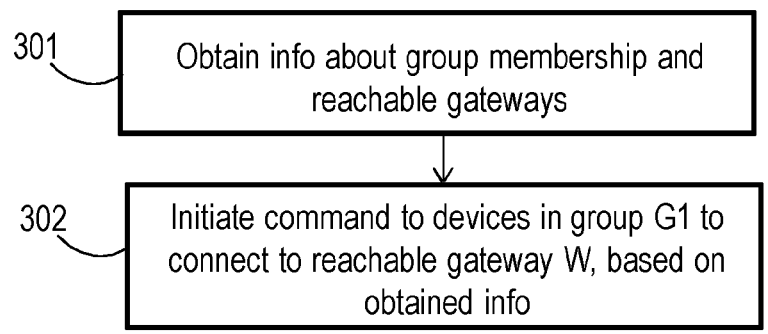
FIG. 3 is a flowchart illustrating a method performed in a communication network by a network node or an arrangement, according to an exemplifying embodiment.

An exemplifying method embodiment for handling groups of devices is illustrated in FIG. 3. The method is to be performed by a network node or a network arrangement operable in a communication network. The network node or network arrangement may be e.g. a central network node, which may be part of a so-called cloud solution, or e.g. a gateway, or even a set of gateways. The method illustrated in FIG. 3 comprises obtaining 301 of information indicating a group membership and indicating reachable gateways of a set of devices. The method further comprises initiating 302 a command to a number of devices out of the set of devices belonging to the same group, G1, to connect to one of the indicated gateways, gateway W, selected for the number of devices based on group membership. The method may involve different actions, depending on whether it is performed by a more central network node or by a gateway. Both alternatives will be exemplified further below.

The information indicating a group membership could comprise an explicit group identity, but could alternatively, e.g. when a group is defined as devices of a certain type or devices having a certain function, be an indication of said type or function. Examples of types and/or functions could be a certain product or model, or a function as humidity sensor or similar. The information indicating reachable gateways could comprise e.g. a list of reachable gateways per device. Such a list could comprise gateway identities, or other indications of gateways. For example, gateways that are reachable with a certain signal strength or other quality measure could be indicated by the obtained information. In embodiments where the method is performed by a gateway, the information may be obtained e.g. directly from devices in the set of devices, or via neighboring gateways and/or via devices relaying information from other, more remote, devices. In embodiments where the method is performed by a central node, the information will be obtained from or via one or more gateways. The term "obtaining" may be assumed to mean e.g. receiving or retrieving.

The initiating of a command to a number of devices may also comprise different actions depending on implementation. For an implementation in a central node, the initiation may comprise instructing one or more gateways to send a command to the devices, or send a command to the devices via one or more gateways. For an implementation in a gateway, the initiating of a command may comprise sending a message to the devices commanding, or instructing, them to connect to the gateway W, which may be the same gateway as the one sending the message, or another gateway.

Figure 5:
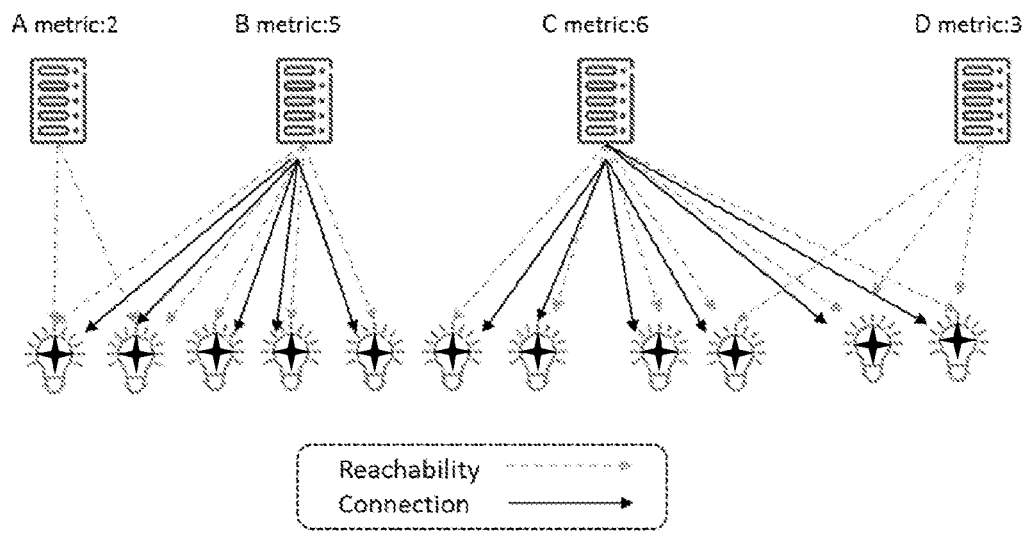
FIG. 5 illustrates reachability and direct connections to a set of gateways A-D, and also indicates a metric for (directly) reachable devices per gateway, according to an exemplifying embodiment.

The gateway W may be selected by the network node or network arrangement based on the obtained information. The gateway W may be selected as being the one of the gateways indicated by devices belonging to the group G1, which is reachable for the highest number of devices belonging said group (G1). For example, a metric of reachable devices within the group G1 could be obtained for each gateway in a set of gateways. Then, it could be determined which gateway, W, out of the set of gateways, that is reachable for the highest number of devices belonging the group G1. FIG. 5 shows an example of such a metric obtained for a set of four gateways. The example in FIG. 5 will be further described below.

According to embodiments described herein, all devices belonging to a group (e.g. G1 above) should preferably be connected to a single gateway. When this is not possible, for various reasons, the devices belonging to a group should be connected to as few gateways as possible. Returning to the example above, when all devices in G1 that are reachable for gateway W have been connected to said gateway, there may still be a number of devices belonging to G1, which cannot be connected to gateway W, since they are not reachable for this gateway. In such a case, a gateway, Z, could be determined, which is reachable by the highest number of devices belonging to the group G1, but not being reachable for, or connectable to, the gateway W. This procedure could then be repeated for devices not being reachable for, or connectable to, any of gateway W or gateway Z, etc.

The devices may be reachable for the gateway directly or via one or more other devices, i.e. via one or more hops. The obtained information indicating reachable gateways may further indicate a distance between a device and at least one of its reachable gateway(s). For example, when a device reaches a gateway with three hops, the distance measure for the device may be "3". A direct connection between device and gateway may be defined as a distance of one hop and a distance measure of "1". When a device belongs to, i.e. is a member of, a plurality of groups, the gateway to which it is to connect to may be selected based on a priority of the respective groups. In other words, the device may be assigned a gateway based on its membership in the group having the highest priority of the plurality of groups. This may entail that the device will connect to another gateway than other devices belonging to the other group or groups out of the plurality of groups, having a lower priority. This could alternatively be expressed as that when a device belongs to more than one group, the gateway for the device may be selected based on the group having the highest priority of the more than one group. The priority of a group may be determined in different ways, e.g. based on an amount of traffic associated with the group.

Figure 4:
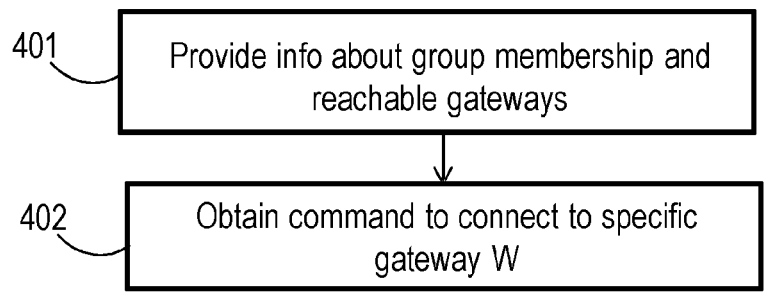
FIG. 4 is a flowchart illustrating a method performed in a communication network by a device, according to an exemplifying embodiment.

FIG. 4 shows an exemplifying method embodiment to be performed by a device with short-range radio communication capabilities operable in a communication network. The method comprises providing 401 information indicating a device group membership of the device to a network node and/or neighboring devices. The provided information may further indicate gateways that are reachable to the device.

The method illustrated in FIG. 4 further comprises obtaining a command to connect to a specific gateway W. The obtained command will be based on the group membership of the device, i.e. on the information indicating the group membership provided by the device. In other words, the specific gateway W will have been selected for the device, by another entity, based on the information provided by the device. This could also be expressed as that the command is obtained in response to the provided information. The device may connect to the gateway W, either directly, or, via one or more other devices belonging to the same group. However, the action of obtaining a command is not mandatory for all embodiments, since there are embodiments where the decision of which gateway to connect to may be taken by the device itself, based on information obtained e.g. from other devices belonging to the same group.

The device may provide the information by broadcasting it. The broadcasted information may then be obtained by neighboring devices and/or gateways. Further, the device may obtain corresponding information from at least one neighboring device, indicating a group membership and reachable gateways for the at least one neighboring device. This obtained information may then be forwarded by the device to a network node and/or neighboring devices. The forwarding may be performed by broadcasting the information. The information obtained from the at least one neighboring device may further comprise a hop/distance counter. This hop/distance counter may be increased by the device before forwarding of the obtained information. Thereby, the total distance or number of hops to a device associated with the obtained information may be determined by an obtainer of the information. A device may refrain from forwarding obtained information e.g. when a value of the hop/distance counter meets a threshold, e.g. is equal to or exceeds a predefined threshold value. Thereby, a limit may be set for how many hops that are allowed between e.g. a device and a gateway for connection to the gateway.

As previously mentioned, there are embodiments where the device does not necessarily obtain a command from another node or entity to connect to a certain gateway W. In such embodiments the device may alternatively obtain information indicating a group membership and reachable devices from a number of other devices belonging to the same group. The device may then determine, based on the information obtained from the number of other devices, which gateway, W, out of a set of gateways reachable by the number of other devices, to connect to. As previously mentioned, this may be the gateway that is reachable by the highest number of devices belonging to the group. The device may then connect to the gateway W. In other words, a device could connect to a certain gateway W, which may be selected for the device by a gateway, by a central network node, by another device in the group, or by the device itself.

As mentioned, the embodiments of the solution described herein can be implemented either using a centralized approach e.g. in a cloud application server, or, using distributed approach at the gateways. Further, the embodiments described herein may be implemented as a "single hop", or "multiple hop" solution. This will be further described below, where more specific exemplifying embodiments will be described.

Single Hop

As previously mentioned, FIG. 1A shows a scenario where devices are connected to gateways without consideration of group membership. In comparison, FIG. 1B shows a scenario, based on embodiments suggested herein, where the same devices are connected to gateways in a manner such that devices of the same group are connected to the same gateway. Thereby, the number of gateways involved in the communication with a group is reduced, which makes such communication more efficient e.g. according to reasons described above.

Two alternative example implementations will be described below.

Centralized Approach for Single Hop:

As depicted in FIG. 5, the gateways reachable by a group of devices may be ordered or ranked, according to how many devices of a given group that are able to connect to them. Each gateway may be associated with a metric indicating how many devices of a given group that are reachable for the gateway, or expressed differently, for how many devices of a group that the gateway is reachable. In FIG. 5, four gateways, A-D, are illustrated, each associated with such a metric. Gateway A is reachable by 2 devices in a group; gateway B by 5 devices in the group; gateway C by 6 devices in the group, and gateway D is reachable by 3 devices in the group. Note that FIG. 5 only considers direct, one-hop, connections between device and gateway. Reachability could alternatively include multi-hop connections. Based on these metrics, it may be concluded that gateway C reaches the highest number of devices belonging to the group. According to embodiments of the solution, as many devices as possible from the group should then be connected to gateway C. The metric may be derived based on information collected by each gateway. For example, each gateway may collect information, from each device currently connected to the gateway, about the groups the device is a member of, and further collect information of which gateways each device can reach. This collected information may be distributed to one or more other gateways, or to a central node, e.g. when the decision is to be taken in a cloud application server. The method may operate on one group at a time. For each gateway, a metric, or count, is generated of how many devices of the group it can reach, as illustrated in FIG. 5. The method may be iterated through the list of gateways starting from the highest count. All devices that are member of the group and that can reach the gateway associated with the highest count are assigned to that gateway. A command to switch gateways is sent to the devices that currently are connected to a different gateway than the assigned gateway. In a next iteration, the gateway associated with the second highest count may be selected, and the devices (out of the remaining devices) reachable to that gateway may be assigned to the gateway. Further iterations may be performed until all devices of a group are assigned to a gateway.

According to a centralized approach, the method described above may be implemented in a cloud application server. The metric for each gateway could then be collected from the gateways, which in their turn could have collected information from the devices belonging to a group.

Distributed Approach (Gateway Approach) for Single Hop:

According to a distributed approach (distributed in relation to the centralized implementation) the decision of which gateway a device should connect to is taken by one or more gateways. A gateway obtains, e.g. collects, from each currently connected device, the groups the device is a member of, and a list of gateways that the device can reach. This obtained information is distributed to its neighbor gateways. Neighboring gateways can negotiate, which devices that should be connected to which gateway, based on the criteria that devices belonging to the same group should be assigned to as few gateways as possible, preferably a single one. The gateways might use the method described above to decide which gateways that should handle a group.

Multiple Hops

As previously mentioned, FIG. 5 illustrates a single-hop reachability between gateways and devices. Reachability may alternatively also include multi-hop reachability, i.e. where devices cannot connect directly to a certain gateway, but can connect to the gateway via a number of other devices in the same group. According to a multi-hop embodiment, devices of a group are connected to as few gateways as possible, either directly or through one or several relaying devices.

Figure 2:
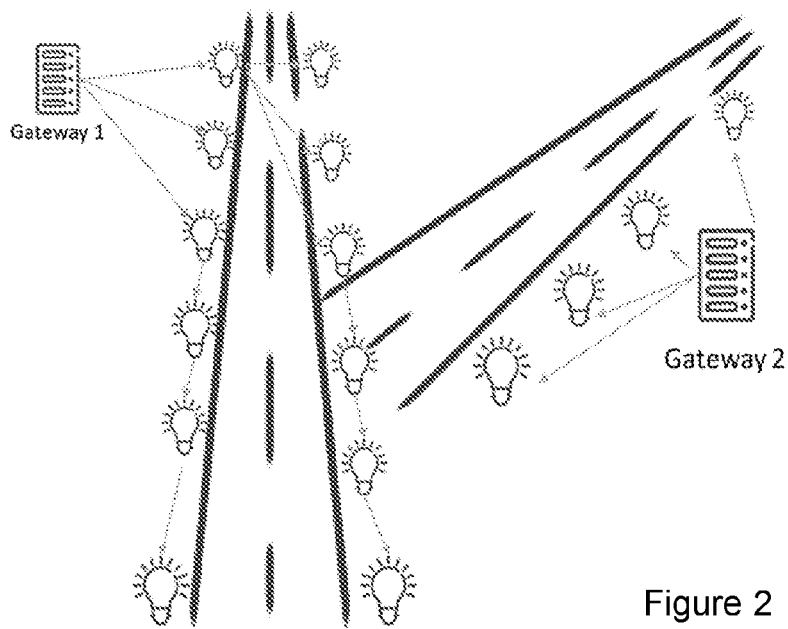
FIG. 2 shows an example of multi-hop gateway selection (to the left) and an example of direct gateway selection (to the right).

FIG. 2 shows a scenario where a group is defined for streetlights on a certain street. When not applying multi-hop reachability, the street lights (devices) along a long street may be connected to several gateways. Further, each gateway may have to handle a high number of groups, e.g. in street crossings. According to embodiments of the invention, one gateway may be selected for each group, and all group members may be connected to that gateway, either directly or via relaying devices, which are also members of the group. Expressed differently, devices that do not have a direct connectivity with a gateway are connected to other devices, so that the interconnected devices form a multi-hop network of devices in the same group, such as illustrated to the left in FIG. 2, and in FIG. 6. Multiple gateways for a group may be assigned e.g. only when the distance in hops or some other distance measure from a device to a gateway is above a threshold, or when there are no intermediate nodes available between two group members or, when constrained requirements of the devices do not allow a multi hop connection.

Embodiments of the solution described herein may also require new functionality in the short range wireless devices. Two alternative example implementations will be described below.

Figure 6:
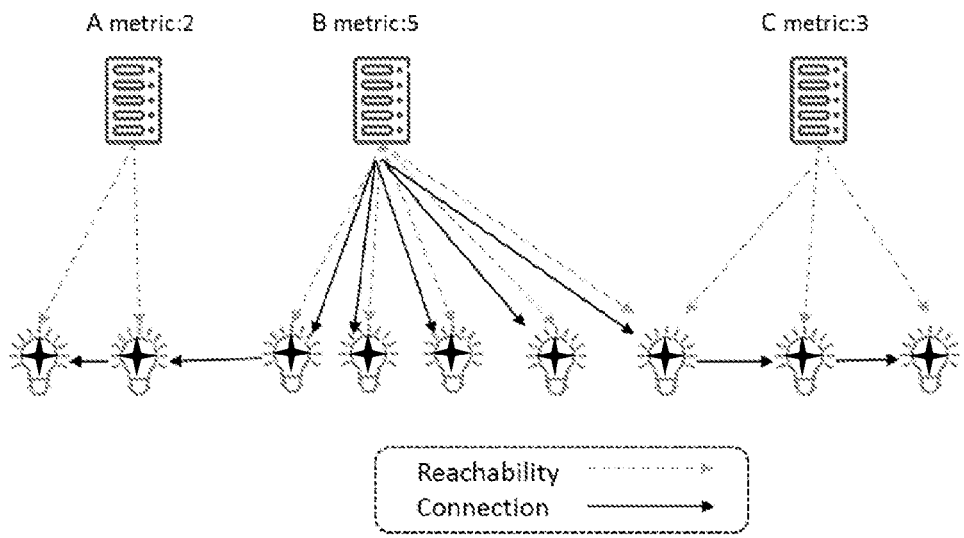
FIG. 6 illustrates reachability and connections, including multi-hop connections, to a set of gateways A-C, and also indicates a metric for (directly) reachable devices per gateway, according to an exemplifying embodiment.

Distributed Approach (Gateway Approach) for Multi Hop:

In an exemplifying embodiment or implementation, devices are configured to broadcast their groups and a list or other indication of gateways that the devices can reach, to neighboring devices. Once a device receives such a broadcast from another device, it repeats it, if it originates from a device in the same group. Each broadcast, which also may be referred to as an announcement, also has an associated distance counter that is initialized to zero by the original sender, and which is increased by one each time the announcement is forwarded. There may be restrictions as to how many hops that are allowed between a device and a gateway. Such a restriction could be implemented by that the announcement is no longer forwarded when the counter reaches a predefined threshold. By the forwarding of announcements described above, overlapping clusters of devices in the same group are formed. A cluster may be defined as a set of devices which are located in the proximity of each other, e.g. within a number N of hops, and also belong to the same group. Thus, in a cluster of devices belonging to the same group, all devices will know which gateways that are reachable by the devices within the cluster. For each gateway, a metric may be calculated, related to how many devices that can be reached by the gateway. The metric depicted for the gateways in FIGS. 5 and 6 is the number of directly reachable devices in a group. Another metric that could be used would be the number of devices reachable by a gateway within a certain number of hops, e.g. 1-5, or 1-10 hops. The gateway with the highest metric is then chosen as the principal gateway for the group. Each node will connect either to that gateway directly, if within direct reach, or to a node that is closer to the gateway than itself, based e.g. on the information from the announcements. Note that a group may be handled by several gateways, e.g. in case the distance between a device and a selected gateway is above a threshold, or, where there are separate islands of devices.

Centralized Approach for Multi Hop:

In another exemplifying embodiment or implementation, devices send an indication of the group to which they belong, and an indication, e.g. a list, of gateways the devices can reach, to a central network node. This can be realized by that the gateways obtain broadcasted announcements, as the ones described above, from the devices, and forward them to a central network node. The method may operate on one group at a time. For each group, the clusters of devices in the group are determined, e.g. based on information obtained from the announcements. A metric is calculated for each gateway that is reachable by devices in a cluster. The metrics may be calculated per cluster. The metric illustrated in FIG. 6 is the number of directly reachable devices in a group. As before, the gateway with the highest metric is chosen as the gateway for the group/cluster. Each node will be assigned to either that gateway directly, if within direct reach, or to a node that is closer to the gateway than itself, based e.g. on the announcements. A command to switch gateways is sent to the devices that currently are connected to a different gateway than the assigned gateway.

Group Prioritization

A single device may belong to multiple groups, such as e.g. the groups "street lights in Road A", and "street lights in Road B (crossing road A)". In this case, one group may be prioritized over another, such that devices belonging to the prioritized group are assigned to a single gateway or as few gateways as possible. The devices of the less prioritized group may then come to be distributed over more gateways than strictly necessary. Groups of devices may be prioritized based on different parameters, such as e.g. usage of the groups, or by the count of messages sent to each group. Prioritization may change over time.

Figure 7A:
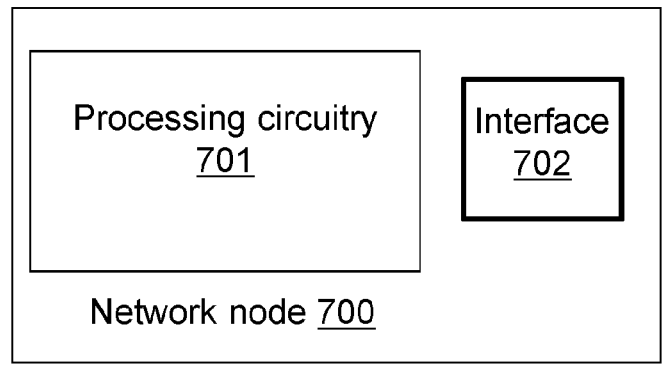
FIGS. 7a-7c are schematic block diagrams illustrating different implementations of a network node or an arrangement, according to exemplifying embodiments.

The methods and techniques described above may be implemented in network nodes, network arrangements and devices. An exemplifying embodiment of a network node or network arrangement, such as a gateway or a node on a higher hierarchical level than a gateway, is illustrated in a general manner in FIG. 7a. The network node/network arrangement 700 is operable in a communication network. The network node/network arrangement 700 is configured to perform at least one of the method embodiments described above with reference to any of FIGS. 1B, 2-3 and 5-6. The network node/network arrangement 700 may be assumed to be associated with the same technical features, objects and advantages as the previously described method embodiments. The network node/network arrangement will be described in brief in order to avoid unnecessary repetition, and will be denoted only "network node" below.

The network node may be implemented and/or described as follows:

The network node 700 may comprise processing circuitry 701 and a communication interface 702. The processing circuitry 701 is configured to cause the network node 700 to obtain information indicating a group membership and indicating reachable gateways of a set of devices. The processing circuitry 701 is further configured to cause the network node 700 to initiate a command to a number of devices out of the set of devices belonging to the same group, G1, to connect to one of the indicated gateways, gateway W, selected for the number of devices based on group membership. The communication interface 702, which may also be denoted e.g. Input/Output (I/O) interface, may include a network interface for sending data to and receiving data from other network nodes and/or to/from devices.

Figure 7B:
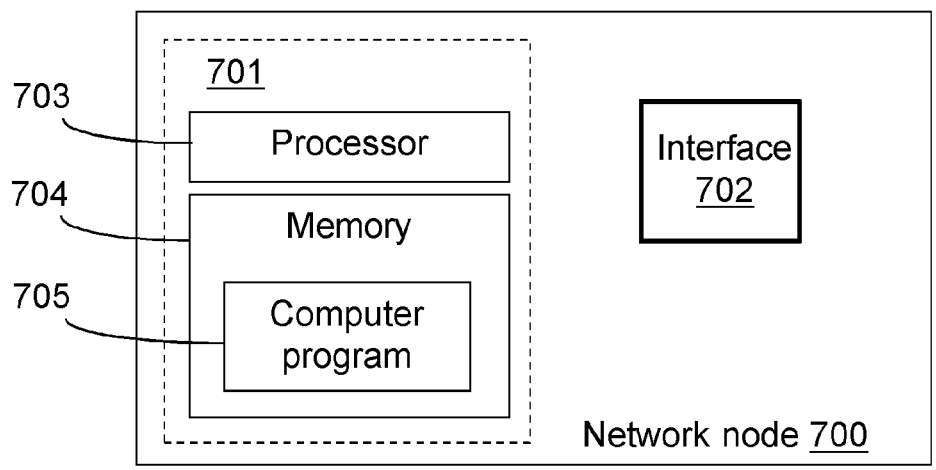

The processing circuitry 701 could, as illustrated in FIG. 7b, comprise processing means, such as a processor 703, e.g. a CPU, and a memory 704 for storing or holding instructions. The memory would then comprise instructions, e.g. in form of a computer program 705, which when executed by the processing means 703 causes the network node 700 to perform any of the actions described above.

Figure 7C:
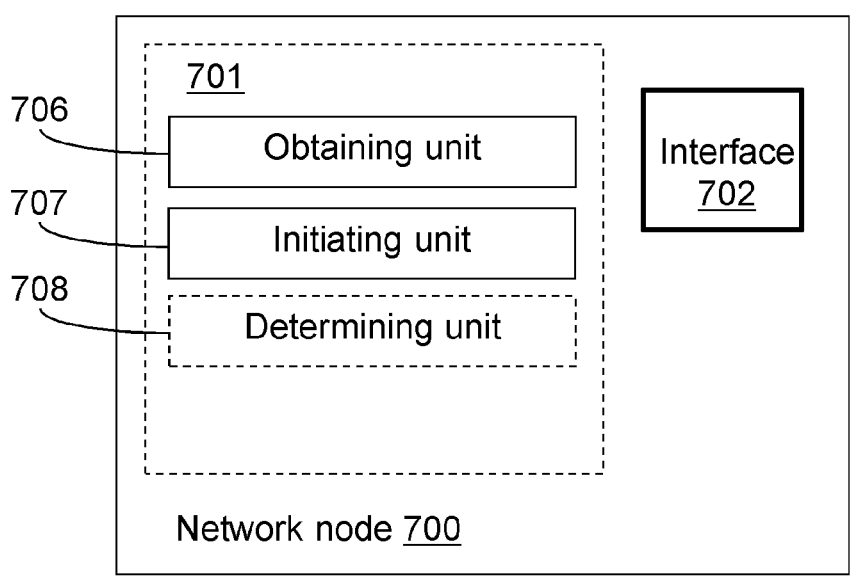

An example of implementation of the processing circuitry 701 is shown in FIG. 7c. The processing circuitry here comprises functional units, such as an obtaining unit 706, configured to cause the network node to obtain information indicating a group membership and indicating reachable gateways of a set of devices. The processing circuitry further comprises an initiating unit 708, configured to cause the network node to initiate a command to a number of devices out of the set of devices belonging to the same group, G1, to connect to one of the indicated gateways, gateway W, selected for the number of devices based on group membership. The processing circuitry may further comprise e.g. a determining unit 707, configured to cause the network node to determine which gateway, W, out of a set of gateways, indicated as reachable by devices belonging to the group G1, that is reachable for the highest number of devices belonging said group. The units 706-708 are here illustrated as different units, but could alternatively be one unit configured for these tasks. The processing circuitry could comprise more units; and actions or tasks could alternatively be performed by one of the other units.

The network nodes described above could be configured for the different method embodiments described herein. The network node 700 may be assumed to comprise further functionality, for carrying out regular node functions.

Figure 8A:
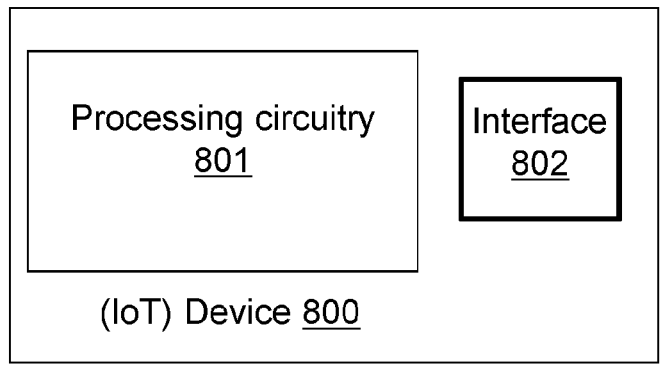
FIGS. 8a-8c are schematic block diagrams illustrating different implementations of a device, according to exemplifying embodiments.

An exemplifying embodiment of a device, such as a sensor device, an electricity meter, a control device associated with e.g. a street light, or the street light itself, is illustrated in a general manner in FIG. 8a. The device 800 is capable of short range radio communication, and is operable in a communication network. The device 800 is configured to perform at least one of the method embodiments described above with reference to any of FIGS. 1B,2, 4-6. The second network node 800 may be assumed to be associated with the same technical features, objects and advantages as the previously described method embodiments. The device will be described in brief in order to avoid unnecessary repetition.

The device may be implemented and/or described as follows:

The device 800 may comprise processing circuitry 801 and a communication interface 802. The processing circuitry 801 is configured to cause the device 800 to provide information indicating a device group membership of the device, and gateways reachable to the device, to a network node and/or neighboring devices. The processing circuitry 801 may further be configured to cause the device 800 to obtain a command to connect to a specific gateway W, wherein the command is based on the group membership of the device. The processing circuitry 801 may further be configured to cause the device 800 to obtain information indicating a group membership and reachable gateways from a neighboring device; and to forward the obtained information to a network node and/or neighboring devices. The communication interface 802, which may also be denoted e.g. Input/Output (I/O) interface, may include a network interface for sending data to and receiving data from other network nodes.

Figure 8B:
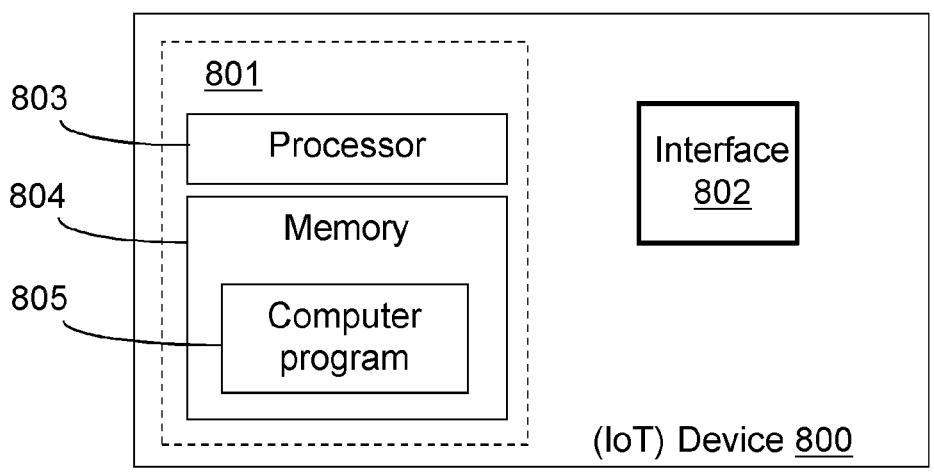

The processing circuitry 801 could, as illustrated in FIG. 8b, comprise processing means, such as a processor 803, e.g. a CPU, and a memory 804 for storing or holding instructions. The memory would then comprise instructions, e.g. in form of a computer program 805, which when executed by the processing means 803 causes the device 800 to perform any of the actions described above.

Figure 8C:
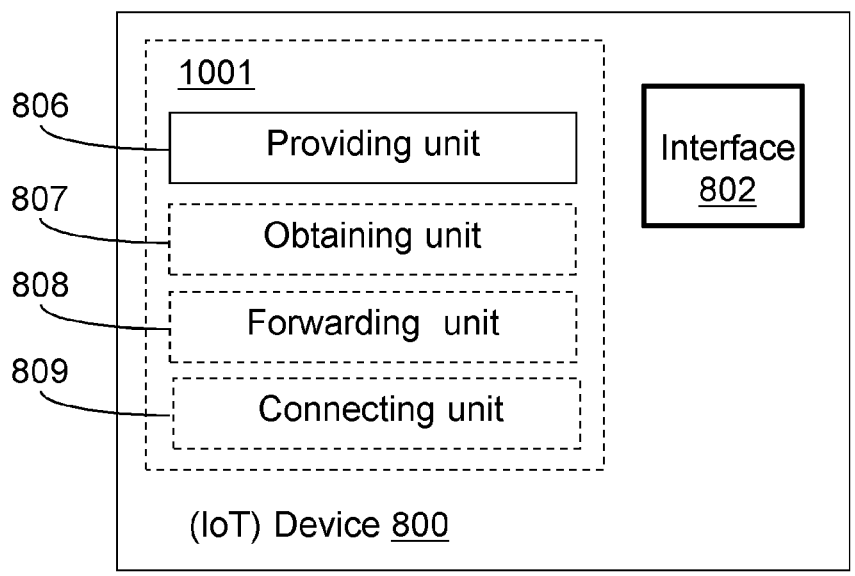

An example of implementation of the processing circuitry 801 is shown in FIG. 8c. The processing circuitry here comprises functional units, such as a providing unit 806, configured to cause the device to provide information indicating a device group membership of the device, and gateways reachable to the device, to a network node and/or neighboring devices. The processing circuitry may further comprise an obtaining unit 807, configured to cause the device to obtain a command to connect to a specific gateway W, wherein the command is based on the group membership of the device. The processing circuitry may further comprise a forwarding unit 808, configured to cause the device to forward obtained information indicating a group membership and reachable gateways for a neighboring device to a network node and/or neighboring devices. The processing circuitry may further comprise a connecting unit 809, for connecting to the gateway W, either directly, or via one or more other devices belonging to the same group.

The units 806-809 are here illustrated as different units, but could alternatively be one unit configured for these tasks. The processing circuitry could comprise more units; and actions or tasks could alternatively be performed by one of the other units.

The devices described above could be configured for the different method embodiments described herein. The device 800 may be assumed to comprise further functionality, for carrying out regular device functions.

The network nodes may be implemented in a distributed manner, e.g. where part of the actions are each performed at different nodes or entities e.g. at different locations in the network. For example, one or more embodiments could be implemented in a so-called cloud solution. The distributed case could be referred to or described as that the method is performed by an arrangement or a network node operable in the communication network, but that the arrangement or the network node could be distributed in the network, and not necessarily be comprised in one physical unit.

The steps, functions, procedures, modules, units and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Further, at least some of the steps, functions, procedures, modules, units and/or blocks described above may be implemented in software such as a computer program for execution by suitable processing circuitry including one or more processing units. The software could be carried by a carrier, such as an electronic signal, an optical signal, a radio signal, or a computer readable storage medium before and/or during the use of the computer program in the network nodes.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, and/or any suitable programmable logic circuitry such as one or more Field Programmable Gate Arrays, FPGAs, or one or more Programmable Logic Controllers, PLCs. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

It should also be understood that it may be possible to re-use the general processing capabilities of any conventional device or unit in which the proposed technology is implemented. It may also be possible to re-use existing software, e.g. by reprogramming of the existing software or by adding new software components.

The embodiments described above are merely given as examples, and it should be understood that the proposed technology is not limited thereto. It will be understood by those skilled in the art that various modifications, combinations and changes may be made to the embodiments without departing from the present scope. In particular, different part solutions in the different embodiments can be combined in other configurations, where technically possible.

When using the word "comprise" or "comprising" it shall be interpreted as non-limiting, i.e. meaning "consist at least of".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

ABBREVIATIONS

IoT Internet of Things
IPSO IP Smart Objects
LAN Local Area Network
M2M Machine to Machine
WAN Wide Area network

The invention claimed is:

1. A method performed by a network node of a communication network for handling groups of devices, the method comprising:
    obtaining information indicating a respective group membership for devices of a set of devices and indicating reachable gateways of the devices of the set of devices,
    wherein initiating a command to a number of devices out of the set of devices belonging to a same group, G1, to connect to one gateway W out of the indicated reachable gateways,
    wherein the gateway W is the one gateway out of the gateways indicated by the devices belonging to the group G1 that is reachable for the highest number of devices belonging to said group G1, and
    wherein the group, G1, comprises the devices with same properties, wherein the properties comprises a device type and device manufacturer;
    for a set of gateways indicated as reachable by devices belonging to the group G1:
        obtaining a metric of reachable devices, belonging to the group, G1, for each of the gateways; and
        determining which gateway, W, out of the set of gateways that is reachable for the highest number of devices belonging to said group.

2. The method according to claim 1, wherein devices which are not directly reachable by the gateway W are commanded to connect to the gateway W via other devices belonging to the group G1.

3. A network node operable in a communication network, the network node comprising:
    communication circuitry configured for communicating with devices; and
    processing circuitry operatively associated with the communication circuitry and configured to:
    obtain information indicating a respective group membership for devices of a set of devices and indicating reachable gateways of the devices of the set of devices,
        wherein the processing circuitry further configured to initiate a command to a number of devices out of the set of devices belonging to the same group, G1, to connect to one gateway W out of the indicated reachable gateways,
        wherein the gateway W is the one of the gateways indicated by devices belonging to the group G1 that is reachable for the highest number of devices belonging to said group G1, and
        wherein the group, G1, comprises the devices with same properties, wherein the properties comprises a device type and device manufacturer;
    for a set of gateways indicated as reachable by devices belonging to the group G1:
        obtain a metric of reachable devices, belonging to the group, G1, for each of the gateways; and to
        determine which gateway, W, out of the set of gateways that is reachable for the highest number of devices belonging said group.

4. The network node according to claim 3, wherein, the processing circuitry further configured to initiate the command to devices which are not directly reachable by the gateway W, to connect to gateway W via other devices belonging to the group G1.

* * * * *